(12) United States Patent
Chiou et al.

(10) Patent No.: US 6,600,644 B1
(45) Date of Patent: Jul. 29, 2003

(54) MICROELECTRONIC TUNABLE CAPACITOR AND METHOD FOR FABRICATION

(75) Inventors: Jing-Hung Chiou, Taipei (TW); Kai-Hsiang Yen, Taipei (TW); Ran-Jin Lin, Hsinchu (TW); Jia-Hroung Wu, Miaoli (TW); Kun-Ho Chou, Hsin-Chu (TW)

(73) Assignee: Industrial Technology Research Institute, Hsin Chu (TW)

( * ) Notice: Subject to any disclaimer, the term of this patent is extended or adjusted under 35 U.S.C. 154(b) by 0 days.

(21) Appl. No.: 10/233,905

(22) Filed: Sep. 3, 2002

(51) Int. Cl.$^7$ .............................. H01G 5/04; H01G 7/00
(52) U.S. Cl. ....................................... 361/292; 361/280
(58) Field of Search .................................. 361/277, 278, 361/280–281, 287–288, 290, 292–297

(56) References Cited

U.S. PATENT DOCUMENTS 5,959,516 A * 9/1999 Chang et al. .................. 334/14
6,105,427 A * 8/2000 Stewart et al. ........... 73/514.32

* cited by examiner

Primary Examiner—Dean A. Reichard
Assistant Examiner—Eric Thomas
(74) Attorney, Agent, or Firm—Tung & Associates

(57) ABSTRACT

A microelectronic tunable capacitor and a method for fabricating the capacitor are described. The capacitor is formed by a micro-actuator, a first fixed capacitor plate and a second swayable capacitor plate suspended over the first plate. The micro-actuator is formed by a pair of fixed electrodes positioned spaced-apart from each other sandwiching without contact a suspended arm electrode swayable between the pair of fixed eletrodes. The second swayable capacitor plate is mounted to the suspended arm and sways by an electrostatic force between the pair of fixed electrodes to suitably adjust a desirable capacitance for the tunable capacitor.

11 Claims, 4 Drawing Sheets

MICROELECTRONIC TUNABLE CAPACITOR AND METHOD FOR FABRICATION

FIELD OF THE INVENTION

The present invention generally relates to a microelectronic tunable capacitor and a method for fabrication, and more particularly, relates to a microelectronic tunable capacitor that can be fabricated by micro-electro-mechanical-system (MEMS) technology compatible with a CMOS process and a MEMS method for fabricating the capacitor.

BACKGROUND OF THE INVENTION

Miniaturization of motors, actuators and similar machine parts is receiving increasing attention because of the new uses of these devices made possible because of their small size. Additionally, these devices can be manufactured in large quantities at low piece-part cost. Current designs of miniaturized machine parts can be categorized according to size or scale. Macroscopic machine parts have a length in the range of approximately 1 to 10 inches, and while microscopic machine parts, sometimes referred to as MEMS (Micro-Electro-Mechanical-Systems) have a length in the range of 0.01 to 1 inch.

In any event, existing miniaturized actuators and motors of both macroscopic or microscopic size are essentially replicas of larger motors, and thus include such component parts as windings, stators, gears, transmission links, etc. These miniaturized parts must be assembled with high precision in order to produce an operable device providing the desired function, e.g. movement of an electrically activated component that then mechanically engages other parts to induce motion. Depending upon the engagement configuration, this motion may be linear in any of several axes, rotary, circular, etc. Because of the number of complex parts that must be assembled with a high degree of precision, the yields of parts meeting target specifications and performance are relatively low using current manufacturing processes. These low yields in turn increase the cost of the parts. Accordingly, it would be desirable to provide a new form of actuator and related method for inducing movement of an object on a microscopic or macroscopic scale which eliminates the problems mentioned above.

The MEMS technology has recently been extended to the semiconductor fabrication industry. In the present state of the art, a semiconductor device is normally formed in a planar structure and therefore the process for fabricating the semiconductor device is generally a planar process. For instance, layers of different materials, i.e. such as insulating materials and metallic conducting materials, are deposited on top of one another and then features of the device are etched through the various layers. The planar fabrication process, while adequate in fabricating most semiconductor elements and devices, is not suitable for fabricating certain devices that are 3-dimensional in nature. For instance, a 3-D solenoid, i.e. or a 3-D inductor coil, must be fabricated by stacking a large number of layers from the bottom to the top and therefore, requires a large number of photomasks to complete the task. For instance, when CMOS technology is used in forming such 3-D solenoid, at least four other steps utilizing photomasks must be incorporated in order to complete the fabrication process. Moreover, the precise alignment between the layers is necessary in order to avoid a variety of processing difficulties occurring at the interfaces.

In recent years, there have been great advances in the application of semiconductor fabrication technology applied to the wireless communication industry. In wireless communication, the use of a microelectronic capacitor or a microelectronic tunable capacitor is an important aspect of the technology. For instance, tunable matching networks, electronically tunable filters and voltage-controlled oscillators have been widely used in microwave communications. To be successfully used in such applications, a tunable capacitor must have a high Q-factor and a wide adjustable range. The wide adjustable range not only provides the necessary frequency range, but also compensates process or temperature induced variations.

Tunable capacitors fabricated by the presently available semiconductor fabrication technology are able to meet the high Q-factor, however, the available tunable range and the possibility of process integration with the standard IC fabrication process are less than desirable. While efforts have been made in designing tunable capacitors by changing the distance between two capacitor plates, the design has many limitations. Among them, the pull-in effect greatly limits the tunable range of the capacitance. In another design that utilizes comb drive-type actuators by changing the overlapped area between two parallel capacitor plates, the amount of displacement between the two parallel plates is limited and thus, impossible to produce the desirable tunable range. Furthermore, the complicated fabrication process of the comb drive structure further limits the potential for process integration with standard IC fabrication technology.

It is therefore an object of the present invention to provide a microelectronic tunable capacitor that does not have the drawbacks or shortcomings of the conventional tunable capacitors.

It is another object of the present invention to provide a microelectronic tunable capacitor that can be fabricated by a MEMS technology.

It is a further object of the present invention to provide a microelectronic tunable capacitor that can be fabricated on a semiconductor substrate by a standard CMOS technology.

It is another further object of the present invention to provide a microelectronic tunable capacitor fabricated by MEMS technology which can be integrated with standard IC fabrication process.

It is still another object of the present invention to provide a microelectronic tunable capacitor which has a capacitive capable of being changed by varying the overlapped area between two capacitor plates without the pull-in defect.

It is yet another object of the present invention to provide a microelectronic tunable capacitor that can be tuned in a broad capacitance range.

It is still another further object of the present invention to provide a MEMS method for fabricating a microelectronic tunable capacitor.

It is yet another further object of the present invention to provide a method for fabricating a microelectronic tunable capacitor by integrating a MEMS technology and a standard CMOS process.

SUMMARY OF THE INVENTION

In accordance with the present invention, a microelectronic tunable capacitor and a method for fabricating the capacitor are provided.

In a preferred embodiment, a microelectronic tunable capacitor is provided which includes a micro-actuator formed by a pair of fixed electrodes positioned spaced-apart from each other sandwiching a suspended arm electrode swayable between the pair of fixed electrodes, the suspended arm electrode has a polarity that is opposite to a polarity of the pair of fixed electrodes; a first capacitor plate situated in a fixed position that has a predetermined area; and a second capacitor plate having an area substantially similar to the predetermined area of the first capacitor plate mounted to a tip of the suspended arm electrode for swaying by an electrostatic force between the pair of fixed electrodes from a completely overlapped position between the first and second capacitor plates achieving maximum capacitance to a completely non-overlapped position achieving minimum capacitance.

In the microelectronic tunable capacitor, the pair of fixed electrodes each has a curvilinear shape curving away outwardly from the suspended arm electrode. The suspended arm electrode is mounted to a fixed position base allowing the electrode to sway from side-to-side in-between the pair of fixed electrodes. The curvilinear shape has a curvilinear surface coated with an insulating material for stopping the movement of the suspended arm electrode. The insulating material used may be silicon oxide. The curvilinear shape may have a curvilinear surface covered with a conductive metal layer for stopping the movement of the suspended arm electrode, wherein the suspended arm electrode may be formed of AlCu or W. The first and the second capacitor plates may be formed of Al, Cu or AlCu. The pair of fixed electrodes may be formed of AlCu or W. The pair of fixed electrodes may have a negative polarity, while the suspended arm electrode may have a positive polarity.

The present invention is further directed to a method for fabricating a microelectronic tunable capacitor that can be carried out by the operating steps of providing a pre-processed semiconductor substrate that includes a bulk silicon substrate; a first dielectric material layer on top of the bulk silicon substrate; at least four metal layers with three dielectric material layers there-in-between formed on top of the first dielectric material layer; depositing a silicon oxide layer on top of and encasing the at least four metal layers; depositing a photoresist layer on top of the silicon oxide layer; patterning and etching an opening through the silicon oxide layer at a first end of the pre-processed semiconductor substrate exposing a second to the uppermost metal layer; etching away the second to the uppermost metal layer forming a structure for a first capacitor plate; and etching away partially a silicon oxide layer on top of and below a metal layer immediately under the second to the uppermost metal layer forming the first capacitor plate situated on a first silicon oxide support on the silicon substrate and a second capacitor plate situated on a second silicon oxide support on the silicon substrate.

The method for fabricating a microelectronic tunable capacitor may further include the step of forming the at least four metal layers with AlCu. The method may further include the step of etching away the second to the uppermost metal layer by a wet etching technique, or by a wet etchant that has a high selectivity toward silicon oxide. The wet etchant may include $H_3PO_4$, $HNO_3$, $CH_3COOH$ and $H_2O_2$. The method may further include the step of etching away partially the silicon oxide layer by a dry etching method, or by a dry etchant that has high selectivity toward the at least four metal layers. The dry etchant may include F or Cl.

BRIEF DESCRIPTION OF THE DRAWINGS

These and other objects, features and advantages of the present invention will become apparent from the following detailed description and the appended drawings in which.

DETAILED DESCRIPTION OF THE PREFERRED AND ALTERNATE EMBODIMENTS

The present invention discloses a microelectronic tunable capacitor that can be fabricated by a MEMS process which is compatible with and therefore can be integrated with the conventional CMOS technology. The microelectronic tunable capacitor fabricated provides a high Q-factor and a wide range of adjustment in capacitance.

The present invention microelectronic tunable capacitor provides numerous benefits including process integration with conventional semiconductor fabrication processes; ease in fabrication by not requiring photomask in back-end etching processes; changing capacitance by varying the overlapped area between two capacitor plates without the pull-in defect in conventional parallel electrode capacitors; adjustment in capacitance not only to increase, but also to decrease; and large displacement between the overlapped area of the two capacitor plates can be achieved by lengthening the suspended arm and the swaying angle of the capacitor plate.

The present invention microelectronic tunable capacitor can be constructed by a micro-actuator, a first, fixed capacitor plate and a second, swayable capacitor plate. The micro-actuator is formed by a pair of fixed electrodes positioned spaced-apart from each other sandwiching without contact a suspended arm electrode swayable between the pair of fixed electrodes, the suspended arm electrode has a polarity opposites to a polarity of the pair of fixed electrodes. The first capacitor plate is situated in a fixed position with a predetermined plate area. The second capacitor plate has an area that is substantially similar, i.e. within ±20%, to the predetermined area of the first capacitor plate that is mounted to a tip of the suspended arm electrode for swaying by an electrostatic force between the pair of fixed electrodes from a completely overlapped position between the first and second capacitor plates achieving a maximum capacitance to a completely non-overlapped position achieving minimum capacitance.

The present invention further discloses a method for fabricating a microelectronic tunable capacitor. The method can be carried out by two different embodiments as described below.

Figure 1A:
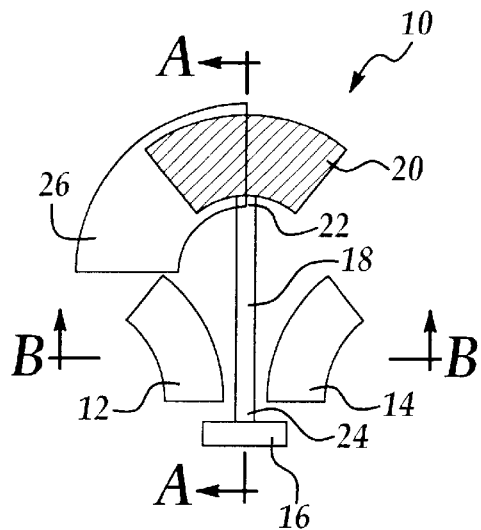
FIG. 1A is a plane view of a present invention microelectronic tunable capacitor.

Referring initially to FIG. 1A, wherein a plane view of a present invention microelectronic tunable capacitor 10 is shown. The tunable capacitor 10 is constructed by a pair of fixed electrodes 12,14, a suspended arm electrode 16 which is connected to a suspended arm 18 with a swayable capacitor plate 20 fixed at an upper end 22. The lower end 24 of the suspended arm 18 is fixed to the suspended arm electrode 16. The tunable capacitor 10 is further equipped with a fixed position capacitor plate 26 which is parallelly positioned, spaced-apart from the swayable capacitor plate 20. A suitable distance between the two parallel capacitor plates 20,26 is about 1 μm.

Figure 1B:
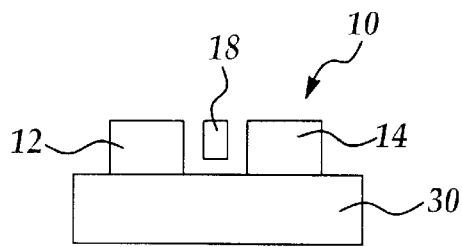
FIG. 1B is an enlarged, cross-sectional view of section BB taken in FIG. 1A.
Figure 1C:
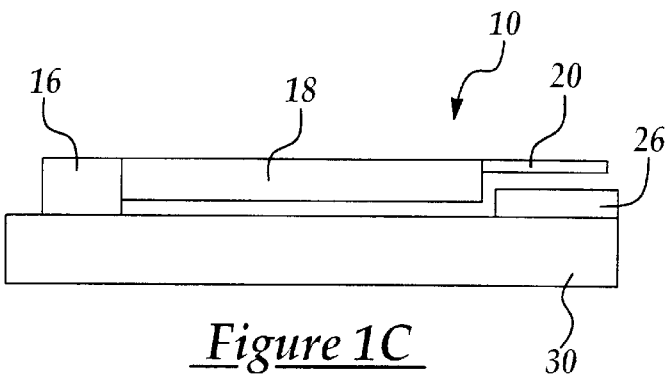
FIG. 1C is an enlarged, cross-sectional view of section AA taken in FIG. 1A.

FIGS. 1B and 1C illustrate an enlarged, sectional view taken along lines BB and AA of FIG. 1A, respectively. For instance, as shown in FIG. 1B, the pair of fixed electrodes 12,14 are fixed or connected to a silicon substrate 30 with the suspended arm 18 suspended above the silicon substrate 30. Similarly, as shown in FIG. 1C, the fixed capacitor plate 26 and the suspended arm electrode 16 are fixed or connected to the silicon substrate 30. The suspended arm 18 and the swayable capacitor plate 20 are further connected to the suspended arm electrode 16. It should be noted, as previously described, the swayable capacitor plate 20 and the fixed capacitor plate 26 are kept in a parallel position, spaced-apart at a distance of about 1 μm. The swayable capacitor plate 20 is kept in a suspended position over the fixed capacitor plate 26.

Figure 2A:
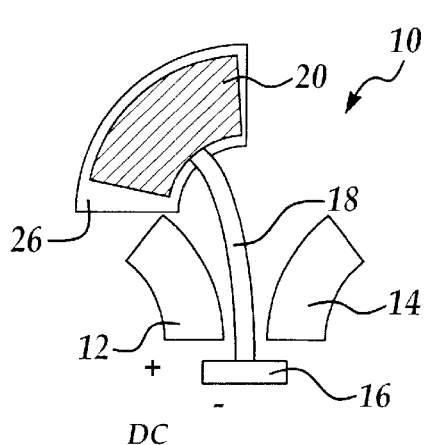
FIG. 2A is a plane view of the present invention microelectronic tunable capacitor of FIG. 1A with the two capacitor plates in a fully overlapped position.
Figure 2B:
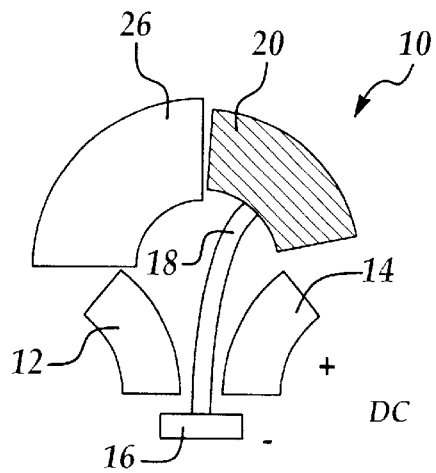
FIG. 2B is a plane view of the present invention microelectronic tunable capacitor of FIG. 1A with the two capacitor plates in a completely non-overlapped position.

The operation of the present invention tunable capacitor can be described as follows, and is shown in FIGS. 2A and 2B. When a DC bias voltage is applied to one of the pair of fixed electrodes 12,14 (in positive polarity as shown in FIGS. 2A and 2B) and a negative polarity applied to the suspended arm electrode 16, an electrostatic force is generated between the suspended arm 18 and on of the pair of fixed electrodes 12,14 which enables the suspended arm 18 to move either to the left or to the right, in the horizontal direction to either overlap the two capacitor plates completely (shown in FIG. 2A) or to completely separate the two capacitor plates (as shown in FIG. 2B). By varying the overlapped area between the two capacitor plates 20,26, the capacitance of the present invention tunable capacitor can be suitably adjusted to a desirable value. For instance, as shown in FIG. 2A, when a DC bias voltage is applied to the fixed electrode 12 and the suspended arm electrode 16, an electrostatic force is generated between the fixed electrode 12 and the suspended arm 18 to cause the swayable capacitor plate 20 to sway to the left toward the fixed capacitor plate 26. In the configuration shown in FIG. 2A, the present invention microelectronic tunable capacitor achieves the maximum capacitance. To the contrary, as shown in FIG. 2B, when a DC bias voltage is applied to the fixed electrode 14 and the suspended arm electrode 16, an electrostatic force between the fixed electrode 14 and the suspended arm 18 moves the swayable capacitor plate 20 to the right and thus, completely separates from the fixed capacitor plate 26. The configuration shown in FIG. 2B therefore achieves a minimum capacitance for the present invention microelectronic tunable capacitor.

Figure 3A:
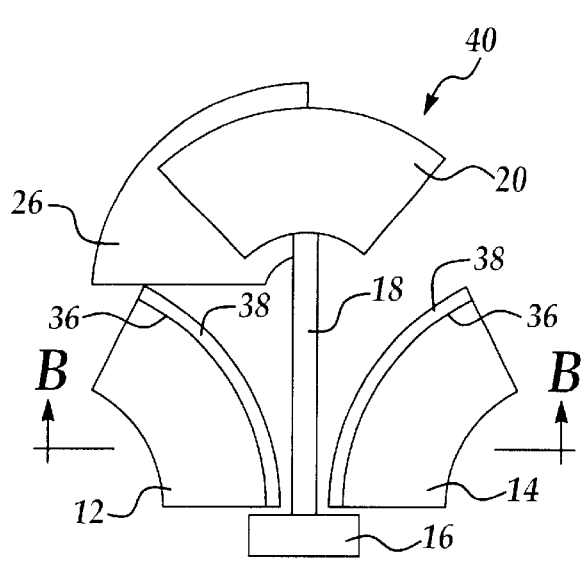
FIG. 3A is a plane view of an alternate embodiment of the present invention.
Figure 3B:
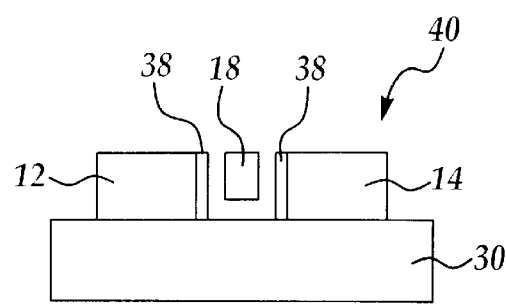
FIG. 3B is an enlarged, cross-sectional view of section BB taken from FIG. 3A.
Figure 3C:
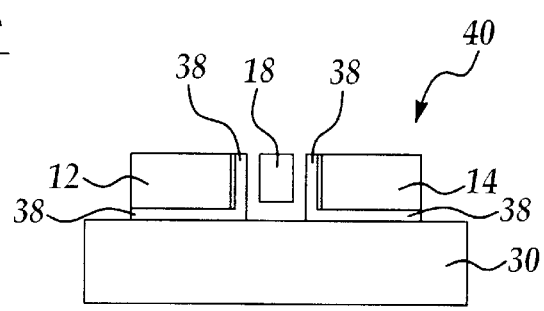
FIG. 3C is an enlarged, cross-sectional view of a second alternate embodiment of the present invention microelectronic tunable capacitor.

A second embodiment for the present invention microelectronic tunable capacitor 40 is shown in FIGS. 3A, 3B and 3C. In the configuration shown in FIG. 3A, the present invention microelectronic tunable capacitor 40 is further equipped with a stopping device 38 installed on the curvilinear surface 36 of the pair of fixed electrodes 12,14. The stopping device 38 is installed conformally to the curvilinear surface 36 to prevent a short circuit when the suspended arm 18 is attracted by an electrostatic force to sway either left or right to prevent a direct contact. Cross-sectional views of the present invention tunable capacitor 40 taken along line BB of FIG. 3A are also shown in FIGS. 3B and 3C. A small variation shown in FIG. 3C wherein the stopping device 38 is further installed between the pair of fixed electrodes 12,14 and the silicon substrate 30. The stopping device 38 can be formed either of an electrically insulating material, such as a ceramic material or silicon oxide, or formed of metal. The pair of fixed electrodes 12,14 are normally formed of AlCu alloys or W. The suspended arm electrode can be formed of similar materials. The first and the second capacitor plates are normally formed of Al, Cu or AlCu alloys.

The present invention method for fabricating a microelectronic tunable capacitor is described below and shown in FIGS. 4A–4D for a preferred embodiment, and in FIGS. 5A–5E for an alternate embodiment.

Figure 4A:
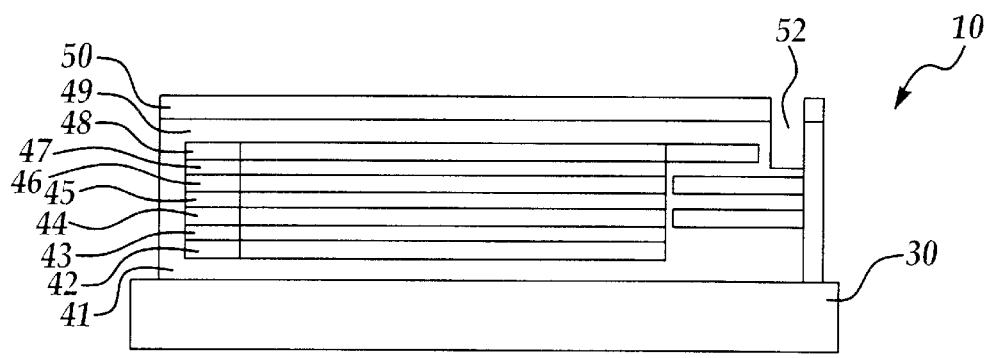
FIG. 4A is an enlarged, cross-sectional view of a pre-processed semiconductor substrate for fabricating the present invention microelectronic tunable capacitor.

In the present invention method for fabricating a microelectronic tunable capacitor, a pre-process semiconductor substrate that is fabricated by a standard CMOS 1P4M process, as shown in FIG. 4A is first provided. The present invention microelectronic tunable capacitor 10, shown in FIG. 4A is built on a pre-processed silicon substrate 30. The standard CMOS 1P4M process deposits at least four metal layers with three dielectric layers there-in-between on top of a silicon substrate, with a dielectric material layer in-between the metal layers and the silicon substrate 30. As shown in FIG. 4A, four separate metal layers 42,44,46 and 48 are deposited on the silicon substrate 30 with dielectric material layers, i.e. such as silicon oxide, 41,43,45 and 47 there-in-between. On top of the four metal layers 42,44,46 and 48 is further deposited a dielectric layer 49 of silicon oxide, and a passivation layer 50. The passivation layer 50 can be suitably deposited of a dielectric material such as silicon nitride or silicon oxide. The four metal layers 42~48 and the four dielectric layers 41~47 form the fixed electrode 12, 14 (FIG. 1A), the suspended arm electrode 16 (FIG. 1A) on the silicon substrate 30. Furthermore, the four metal layers 42~48 and the three dielectric layer 43~47 form the suspended arm 18, while the metal layer 48 forms the swayable capacitor plate.

Figure 4B:
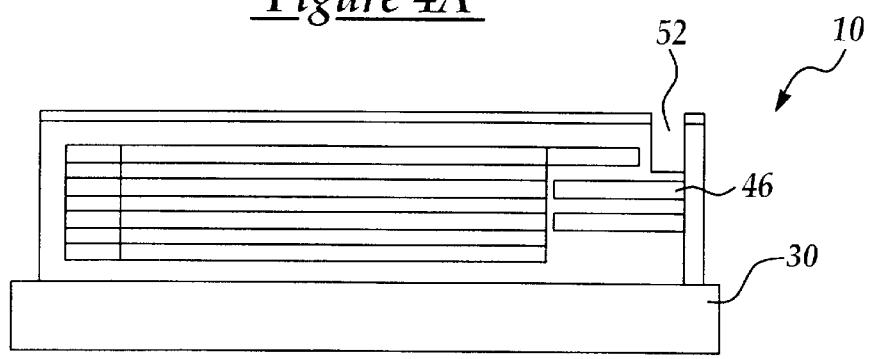
FIG. 4B is an enlarged, cross-sectional view of the pre-processed semiconductor substrate of FIG. 4A with silicon oxide layer removed and metal layer exposed.
Figure 4C:
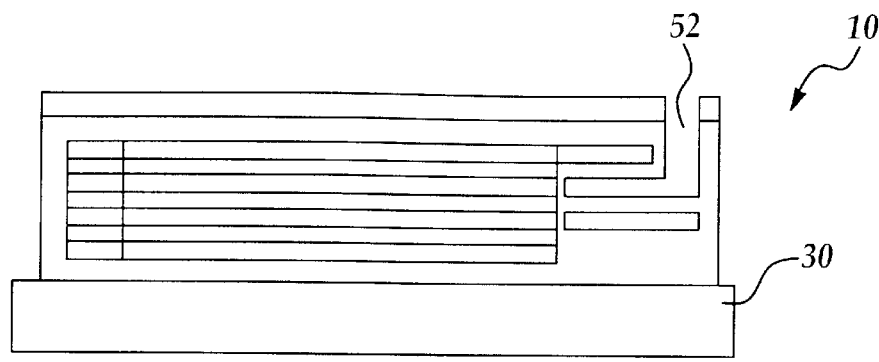
FIG. 4C is an enlarged, cross-sectional view of the pre-processed semiconductor substrate of FIG. 4A with the second to the uppermost metal layer etched away.

In the next step of the process, a photolithography method is utilized to open window 52 in the silicon oxide layer 49, 47. FIG. 4B shows a completion of the window opening process wherein the window 52 exposes the metal layer 46. A wet etching process, utilizing a wet etchant that has a high selectivity toward silicon oxide, is then used to remove partially the metal layer 46, as shown in FIG. 4C. The wet etchant may be suitably an acidic solution that contains $H_3PO_4$, $HNO_3$, $CH_3COOH$ and $H_2O_2$. The metal layer 46 functions as a sacrificial layer.

Figure 4D:
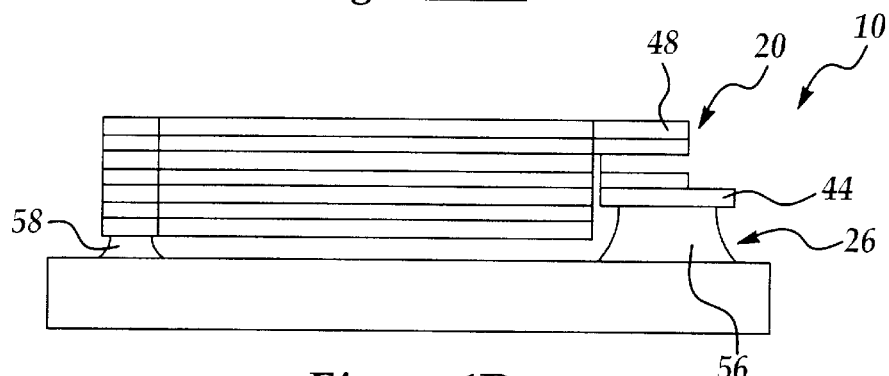
FIG. 4D is an enlarged, cross-sectional view of the present invention microelectronic tunable capacitor with the silicon oxide layer etched away and the two capacitor plates released.

A dry etching method, such as reactive ion etching, is then carried out to etch away the silicon oxide layer 41 in-between the first metal layer 42 and the silicon substrate 30 with only a capacitor plate anchor 58 remaining. Similarly, a fixed capacitor plate anchor 56 is formed for the fixed capacitor plate 26. This is shown in FIG. 4D. The dry etching process can be carried out by using a dry etchant that has high selectivity toward the metal layers. For instance, an etchant gas mixture of $CF_4$ and $O_2$. FIG. 4D shows a cross-sectional view taken along section AA of FIG. 1A. The present invention microelectronic tunable capacitor 10 is thus completed as indicated by FIG. 4D by forming the suspended, swayable capacitor plate 20.

An alternate embodiment of the present invention method for forming the microelectronic tunable capacitor 60 is shown in FIGS. 5A–5E.

Figure 5A:
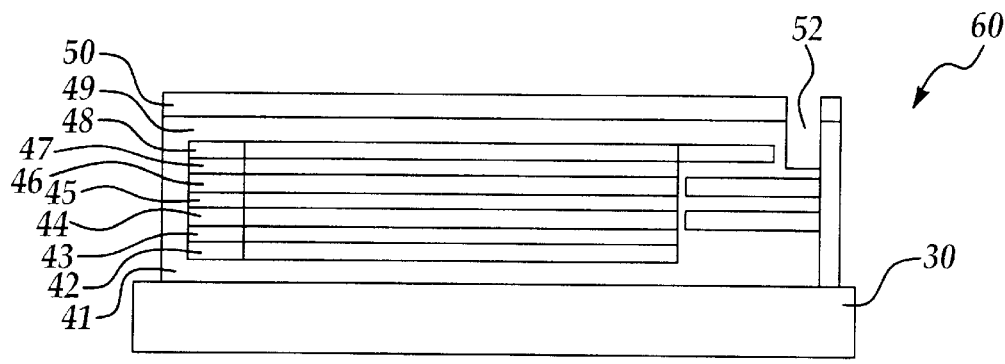
FIG. 5A is an enlarged, cross-sectional view of a pre-processed semiconductor substrate for an alternate embodiment of the present invention microelectronic tunable capacitor.
Figure 5B:
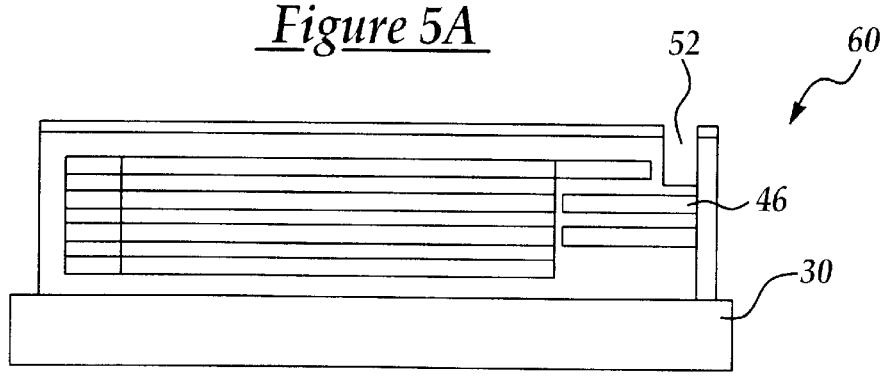
FIG. 5B is an enlarged, cross-sectional view of a pre-processed semiconductor substrate of FIG. 5A with a layer of silicon oxide removed.
Figure 5C:
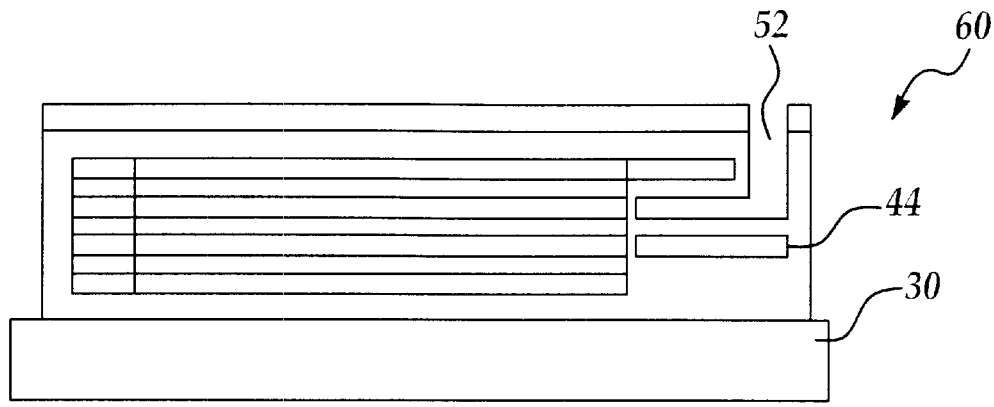
FIG. 5C is an enlarged, cross-sectional view of the present invention alternate embodiment of FIG. 5B with the next to uppermost metal layer etched away.
Figure 5D:
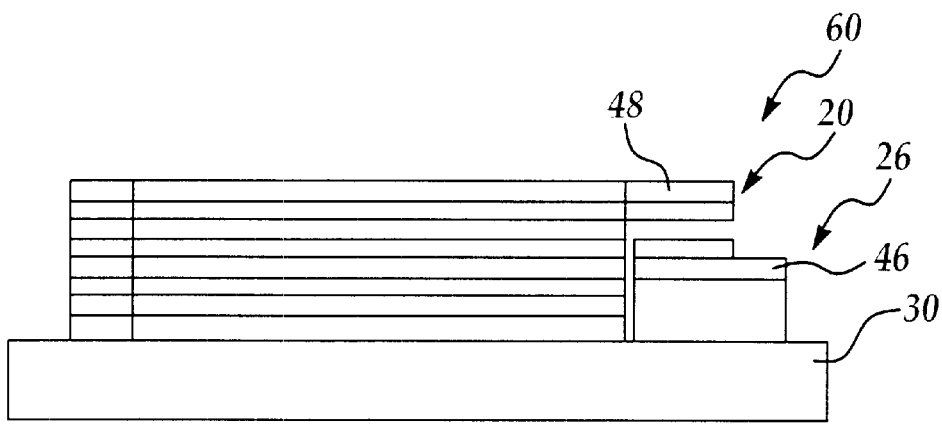
FIG. 5D is an enlarged, cross-sectional view of the present invention alternate embodiment of FIG. 5C with the silicon oxide layer partially removed by anisotropic etching.

In the first step of the alternate embodiment process, as shown in FIG. 5A, a process step is similar to that used in the preferred embodiment of FIG. 4A. The next two steps, shown in FIGS. 5B and 5C, are also similar to that used in the preferred embodiment, shown in FIGS. 4B and 4C. In the next step of the process, as shown in FIG. 5D, anisotropic etching is conducted to etch away the silicon oxide layer to the silicon substrate 30. A dry etchant similar to that used in the preferred embodiment is utilized, i.e. an etchant gas mixture of $CF_4$ and $O_2$.

Figure 5E:
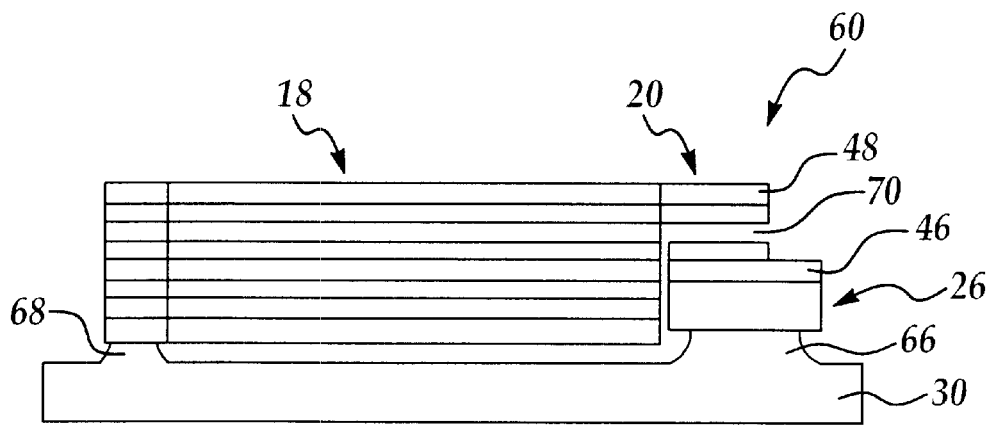
FIG. 5E is an enlarged, cross-sectional view of the present invention alternate embodiment of FIG. 5D with the remaining silicon oxide layer etched away to release the two capacitor plates.

In the last step of the process, shown in FIG. 5E, a dry etch, or an isotropic etch method is used to remove the top layer of silicon substrate 30 in forming the capacitor plate anchors 66, 68. The capacitor plate anchor 68 supports the fixed capacitor plate 26 while the anchor 68 supports the swayable capacitor plate 20. The dry etching process, utilizing an etchant gas of $SF_6$, is used to release the suspended arm 18 from the silicon substrate 30 and therefore, making the suspended arm 18 in a suspended state. As shown in FIG. 5E, the swayable capacitor plate 20 is suspended over the fixed capacitor plate 26 at a suitable distance. A suitable distance for the gap 70 may be between 0.5~5 μm, or 1 μm. The operation of the completed tunable capacitor structure shown in FIG. 5E is similar to that shown in FIGS. 1A~2B.

The present invention microelectronic tunable capacitor and the method for fabricating the capacitor have therefore been amply described in the above description and in the appended drawings of FIGS. 1A~5E.

While the present invention has been described in an illustrative manner, it should be understood that the terminology used is intended to be in a nature of words of description rather than of limitation.

Furthermore, while the present invention has been described in terms of a preferred and an alternate embodiment, it is to be appreciated that those skilled in the art will readily apply these teachings to other possible variations of the inventions.

The embodiment of the invention in which an exclusive property or privilege is claimed are defined as follows.

What is claimed is:

1. A microelectronic tunable capacitor comprising:

a micro-actuator formed by a pair of fixed electrodes positioned spaced-apart from each other sandwiching without contact a suspended arm electrode swayable between said pair of fixed electrodes, said suspended arm electrode having a polarity opposite to a polarity of said pair of fixed electrodes;

a first capacitor plate situated in a fixed position having a predetermined area; and a second capacitor plate having an area substantially similar to said predetermined area of said first capacitor plate mounted to a tip of said suspended arm electrode for swaying by an electrostatic force between said pair of fixed electrodes from a completely overlapped position between said first and second capacitor plates achieving maximum capacitance to a completely non-overlapped position achieving minimum capacitance.

2. A microelectronic tunable capacitor according to claim 1, wherein said pair of fixed electrodes each having a curvilinear shape curving away and outwardly from said suspended arm electrode.

3. A microelectronic tunable capacitor according to claim 1, wherein said suspended arm electrode being mounted to a fixed position base allowing said electrode to sway from side-to-side in-between said pair of fixed electrodes.

4. A microelectronic tunable capacitor according to claim 2, wherein said curvilinear shape having a curvilinear surface coated with an insulating material for stopping the movement of said suspended arm electrode.

5. A microelectronic tunable capacitor according to claim 4, wherein said insulating material is silicon oxide.

6. A microelectronic tunable capacitor according to claim 2, wherein said curvilinear shape having a curvilinear surface covered with a conductive metal layer for stopping the movement of said suspended arm electrode.

7. A microelectronic tunable capacitor according to claim 1, wherein said suspended arm electrode is formed of AlCu or W.

8. A microelectronic tunable capacitor according to claim 1, wherein said first and second capacitor plates are formed of Al, Cu or AlCu.

9. A microelectronic tunable capacitor according to claim 1, wherein said pair of fixed electrodes are formed of AlCu or W.

10. A microelectronic tunable capacitor according to claim 1, wherein said pair of fixed electrodes have a negative polarity.

11. A microelectronic tunable capacitor according to claim 1, wherein said suspended arm electrode has a positive polarity.

* * * * *